United States Patent Office 3,361,570
Patented Jan. 2, 1968

3,361,570
PROCESS FOR PREPARING FERMENTED MALT BEVERAGES USING AN EXCESS OF WATER IN PREPARING THE WORT AND THEN FREEZE CONCENTRATING THE DILUTE WORT PRIOR TO FERMENTING AND FINISHING
Emil A. Malick, Bartlesville, Okla., assignor to Phillips Petroleum Company, a corporation of Delaware
No Drawing. Filed Dec. 13, 1963, Ser. No. 330,254
1 Claim. (Cl. 99—31)

ABSTRACT OF THE DISCLOSURE

A fermented malt beverage is prepared wherein in the mashing step an excessive amount of water is employed and the resulting dilute wort is freeze concentrated prior to fermentation and finishing.

This invention relates to a process for preparing fermented malt beverages, such as a beer and ale. In another aspect it relates to a process for brewing wort used in preparing such fermented malt beverages, and to the wort so brewed as a new composition of matter.

The process of preparing fermented malt beverages, such as beer and ale, is historically well-established. As practiced in modern breweries, the process comprises, briefly, preparing a "mash" of malt, usually with cereal adjuncts, and heating the mash to solubilize the proteins and convert the starch into sugar and dextrins. The insoluble grains are filtered off and washed (sparged) with hot water and the washings combined with the soluble material and the resulting wort boiled in a brew kettle to inactivate enzymes, sterilize the wort, extract desired hop components from added hops, and coagulate certain protein-like substances. The wort is then strained to remove spent hops, cooled and pitched with yeast and fermented. The fermented brew is then aged and clarified, filtered, and carbonated to produce an alcoholic malt beverage.

In the conventional brewing process, the starchy brew materials are not fully utilized. The amount of water used in the mashing operation (usually 1 barrel per 100 pounds of brew materials and 1.5 barrels of water for sparging) is such that only 70 to 80 percent or less of the starchy and protein materials are extracted or solubilized in order to produce from the mash a fairly thick wort, e.g., a wort with an extract of 11 to 12° Balling. Such a thick wort is necessary in order to allow fermentation to take place at a sufficient rapid rate and produce the desired amount of alcohol. Although a greater yield of soluble material could be obtained from the brew material by using a greater amount of water in the mashing operation, a relatively thin or dilute wort would be produced, which wort would not ferment at the desired rate and would produce a beverage having a low alcoholic content. As such, brewers rather accept the economic disadvantage of a low extract yield from the starchy brew materials than produce a dilute wort which does not have desirable fermentation character. The significant amount of insolubilized protein and starch materials contained in the undissolved brew materials filtered out from the mash are lost in the brewing process. The loss of such valuable materials is an accepted expense which, of course, affects the economics of the process.

Accordingly, an object of this invention is to provide an improved process for fermenting malt beverages. Another object is to provide an improved process for brewing wort used in preparing such fermented malt beverages. Another object is to produce a wort having a desired extract content while at the same time obtain a high yield or extract from brew materials. Another object is to improve the utilization of brew materials and the production of wort. Other objects and advantages of this invention will become apparent to those skilled in the art from the foregoing discussion and appended claims.

According to this invention, mashing of natural starchy brew materials, such as barley malt, is carried out using an amount of water (e.g., 1.5 to 5 barrels of water per 100 pounds of brew materials) greater than that used heretofore in order to obtain a greater utilization or yield of such materials and produce a relatively thin or dilute wort, which itself is unsuitable for fermentation, and then a sufficient amount of water is removed from said dilute wort by freeze concentration thereof to produce a relatively thick fermentable wort which can be readily fermented to produce a malt beverage having an appealing taste, aroma and appearance and other properties comparable to that produced by the conventional brewing process.

As a first step in this invention, a malt mash is prepared by doughing in malt, preferably barley malt, in a "mash tub" or the like with one barrel of water (31 gallons) for every 35–75 pounds of malt, preferably for every 35–50 pounds of malt, at a temperature, for example, in the range of 90–110° F., usually 100–105° F. The malt mash is stirred and can be allowed to rest for 30 minutes to allow for enzymic digestion. Thereafter the temperature of the mash is raised, for example to 155–160° F., and held at this temperature, for example for about 30 minutes, to allow for saccharification. Where cereal adjuncts, such as refined grits, corn grits, rice, etc., are employed, this rise in temperature can be accomplished by pumping boiling adjunct mash into the main malt mash, the malt making up 60–80 percent of the brew materials. The adjunct mash itself can be prepared by doughing in a cereal cooker or the like about 30–100 pounds of dry cereal materials for each barrel of water and heating the adjunct mash to boiling for 10–30 minutes. The combined malt and adjunct mash can be stabilized or "mashed off" by heating to 170–175° F. to stop enzymic activity, after which the mash is allowed to cool for 20–30 minutes. The finished mash (e.g., with 70–100 percent yield of brew materials) comprises a suspension of spent grain in a dilute sugar wort or solution of soluble protein and starch converted sugars and the mash can then be filtered in a lauter tub or the like to remove the insoluble spent grains. The grains can be washed (sparged) with hot water (e.g., 1–2 barrels of water per 100 pounds of brew materials) and the washings combined with the soluble wort.

The dilute sweet wort, e.g., with an extract of 5 to 10.5° Balling, can then be passed to a brew kettle or the like where it is boiled, e.g., for ½ to 1 hour. Hops or extracted hop components can be added to the boiling mixture to impart flavor and aroma. The boiling inactivates the enzymes, sterilizes the wort, extracts desired hop components, and coagulates certain protein-like substances. Although some of the water, e.g., 10 percent, in the wort will be lost by evaporation during boiling, and the wort as a result somewhat concentrated, the boiling wort can still be considered as being fairly dilute as compared with that normally produced, i.e., the boiled wort will still have an extract of less than 11° Balling. After boiling, the wort can be strained to remove hops and other precipitates and the pH can be adjusted, for example, by the addition of 0.3 to 0.5 percent of potassium sulfate, potassium phosphate, or lactic acid to maintain the pH at about 5 to 6.

(Instead of adding hops to the wort when it is boiled, the desired hop flavor and aroma can be incorporated in the brew or beer in part or entirely by the addition of hop extracts to the young beer leaving the fermentors or by addition of such extracts at later processing stages, as disclosed in my copending application, Case 13,920, filed concurrent herewith.)

The dilute wort is itself not suitable for fermentation and, according to this invention, it is concentrated to the desired extract level (at which fermentation may readily take place) by freeze concentration of the dilute wort to remove a significant portion of the water therefrom, e.g., 30 to 80 weight percent.

The freeze concentration step can be carried out batchwise, for example using a plurality of alternate ice-generators and centrifuges connected in series, or, preferably, by the freeze concentration process known in the brewing industry as the Phillips' Fractional Crystallization Process, described in the Brewer's Digest, October 1961, and basically covered by U.S. Reissue Patent No. 23,810 to J. Schmidt and U.S. Patent No. 2,854,494 to R. W. Thomas. Application of the Phillips' Process to the concentration of the above-described dilute wort comprises cooling the dilute wort to produce a slurry of ice crystals and mother liquor, melting the crystals, passing at least a portion of the melt in contact with and countercurrent to the crystals, and separating the mother liquor (or concentrated wort) and the melted ice, such continuous process being preferably being carried out in a plurality of stages, e.g., three. If desired, the concentrated wort which is produced by the concentration step can be filtered to remove any precipitated material not removed with the ice. Suitable apparatus for carrying out the freeze concentration of the dilute wort by a continuous process is that shown in said patents to Schmidt and Thomas. Schmidt's process involves moving a mixture of crystals and adhering liquid through a liquid removal zone, a reflux zone and a melting zone, removing liquid in said liquid removal zone, melting crystals in said melting zone, withdrawing part of the melt from the melting zone, and forcing another part of the melt in a direction countercurrent to the movement of crystals in said reflux zone. In Thomas' process (which is an improvement over the separation of the type disclosed by Schmidt), the solids in the purification zone are countercurrently contacted with a pulsating flow of reflux liquid by application against the melt of pulsating pressure generated by a pulse pump, the pulsation of the reflux liquid occurring during sustained application of force to the crystals to feed the same into the liquid removal zone.

The amount of water removed from the dilute wort by said freeze concentration step will vary and will be governed by the desired extract content of the concentrated wort. Preferably, the amount of water removed will be that sufficient to provide a wort concentrate having an extract of 11 to 13° Balling, though it can be lower or higher than this range. It is also within the scope of this invention to concentrate the wort to a level greater than that desired for fermentation, and thereafter to dilute such highly concentrated wort with water to the relatively lower extract level desired for fermentation. For example, savings in storage and shipping of the concentrate can be realized by such high concentration of the dilute wort and its subsequent dilution to the desired extract level just prior to the fermentation step.

The concentrated wort produced by this invention can be fermented and finished using the usual standard procedures, equipment and materials, all of which are of general knowledge and substantially the same throughout the industry throughout the United States. For example, cooled concentrated wort is pitched with yeast, e.g., one pound of liquid yeast per barrel of brew, using bottom yeast in the case of beer and top yeast in the case of ale. After fermentation is completed, the yeast is removed and the "young beer" is passed to storage where it is clarified and aged, and then is pasteurized, stored, filtered, chill-proofed, carbonated, finished and filtered.

As an example of this invention, a malt mash is prepared by doughing in a mash tub 50 pounds of malt per barrel of water at 105° F. The mash is stirred for 10 minutes and allowed to rest for 30 minutes. A cereal adjunct mash is prepared by doughing in a cereal cooker 30 pounds of corn grits per barrel of water at 105° F. The adjunct mash is allowed to rest 30 minutes and then heated with steam to boiling for 15 minutes. The boiling adjunct mash is pumped into the main mash tub, raising the temperature thereof to 160° F., at which temperature the mash is held for 20 minutes. Thereafter, the combined mash (with the malt making up 80 percent of the brew materials) is heated with steam to a mash-off temperature of 175° F. and allowed to settle for 30 minutes. The settled mash is then run into a lautering tub where it is filtered on a bed of malt husks at 172° F., the first wort filtrate being recycled to the tub until clear and thereafter the filtrate being passed to a brew kettle. The filtered spent grains, containing 80 percent liquid and residual extract, is sparged with 1.5 barrels of hot water per 100 pounds of brew materials. The washings are added to the wort in the brew kettle to provide a dilute wort having an extract of 8° Balling. The wort in the brew kettle is boiled for one hour to yield a finished dilute wort having an extract of 8.5° Balling and then passed through a Bandelot cooler. Cooled wort, at 45° F., is passed to a hold tank. The cooled wort is then filtered over a diatomaceous earth filter bed to remove spent hops and the filtrate passed to a second hold tank. The filtered, cool, dilute wort is then freeze concentrated according to the Phillips' process, to remove 75 weight percent water and produce a concentrated wort having an extract of 12° Balling. In carrying out the freeze concentration step, the dilute wort is cooled to 29° F. in a first chiller to form a slurry of ice crystals in mother liquor, the slurry (with 50 percent ice solids) is passed to a first crystal separation column to separate said ice crystals, the mother liquor is cooled in a second chiller to 25° F. to form a second slurry of ice crystals, the latter slurry (with 50 percent ice solids) is passed to a second crystal purification column to separate ice crystals, and the resulting mother liquor withdrawn from the latter column as a concentrated wort with an extract of 12° Balling. The concentrated wort is then passed to a tank where it is aerated with sterile air and pitched at 45° F. with 1 pound of liquid bottom yeast per barrel. The brew is then passed to fermentation tanks where its temperature is allowed to rise to 54° F. at which point it is cooled to 45° F. and held at this temperature 8 days to complete fermentation. The brew is cooled to 40° F. and the young beer with an extract of 3.6° Balling is decanted from the yeast, cooled to 32° F. and passed to storage where it is held for 2 weeks to allow it to clarify and age. The aged beer is decanted and filtered over a diatomaceous earth filter bed. Chillproofing agent is added to the filtered beer and it is carbonated and passed to cellar storage tanks for 2 weeks storage, after which it is finally filtered to yield a beer having an alcohol content of 3.65 weight percent, a specific gravity of 1.0131, an apparent extract of 3.5 percent, and a real extract of 5.1 percent.

Various modifications and alterations of this invention will become apparent to those skilled in the art from the foregoing description without departing from the scope and spirit of this invention, and it should be understood that this invention is not to be limited unduly to that set forth herein for illustrative purposes.

I claim:
1. In a process for preparing a fermented malt beverage, wherein brew materials are mashed with water, the resulting mash is heated and wort is separated therefrom, said wort is boiled, cooled and fermented, and the fermented brew is finished to produce said beverage, the improvement comprising using in said mashing step 1.5 to 5 barrels of water per 100 pounds of said brew materials and produce a dilute wort having an extract of less than 11° Balling, freeze concentrating the dilute boiled wort to remove 30 to 80 weight percent water therefrom and produce a concentrated wort which can be readily fermented, and subjecting said concentrated wort to said steps of fermentation and finishing.

References Cited

UNITED STATES PATENTS

| | | | |
|---|---|---|---|
| 78,874 | 6/1868 | Hawks | 99—31 X |
| 1,338,803 | 5/1920 | Wilhelmy | 99—52 X |
| 1,673,274 | 6/1928 | Wallerstein | 99—52 X |
| 2,685,783 | 8/1954 | Benscheidt et al. | |

OTHER REFERENCES

Hind, H. L., Brewing Science and Practice, Chapman and Hall, London, 1950 TP 570H55C.2 (page 679).

A. LOUIS MONACELL, *Primary Examiner.*

D. M. NAFF, *Assistant Examiner.*